E. BROWN.
POTATO CUTTER.
APPLICATION FILED JULY 7, 1909.
947,467.
Patented Jan. 25, 1910.
2 SHEETS—SHEET 1.
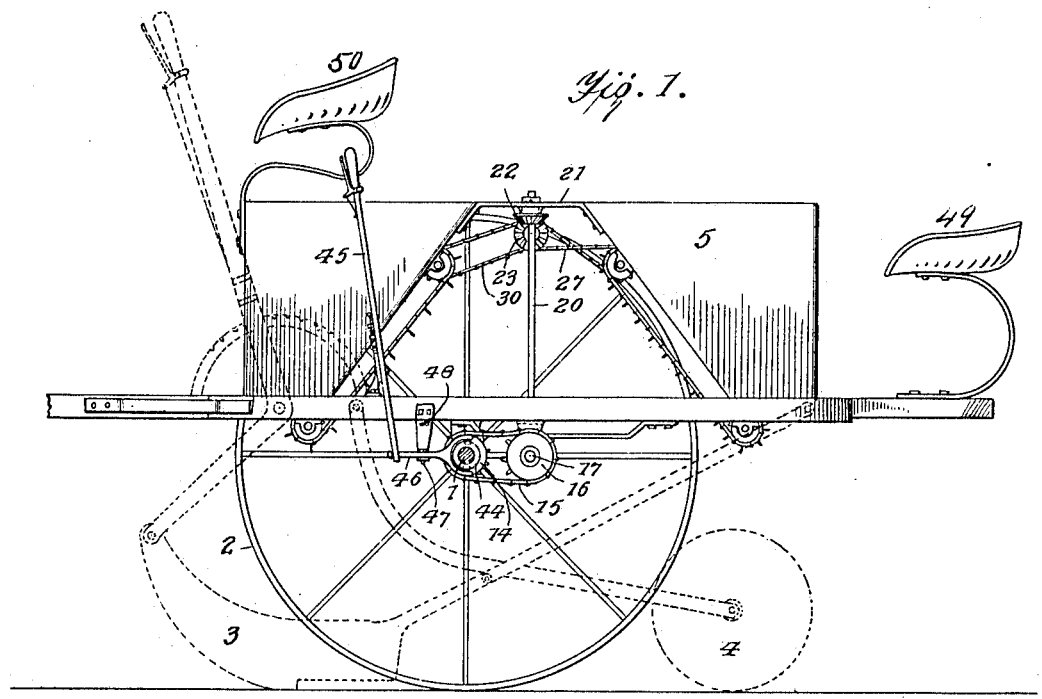
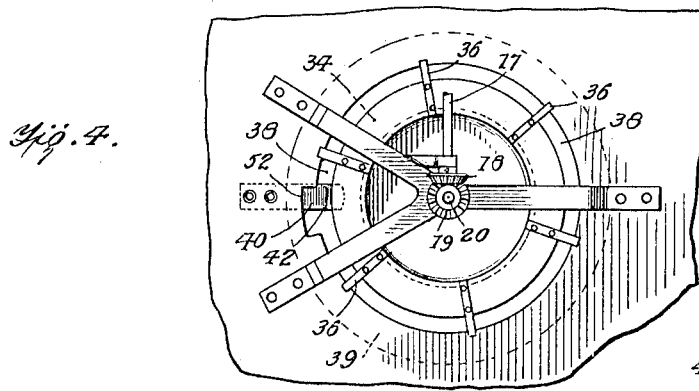
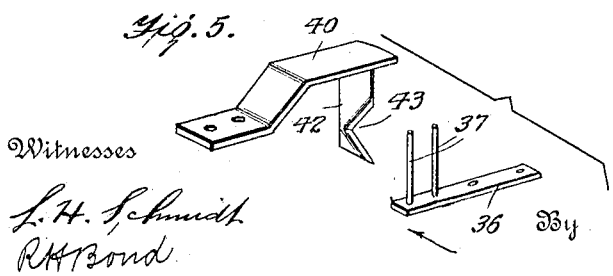
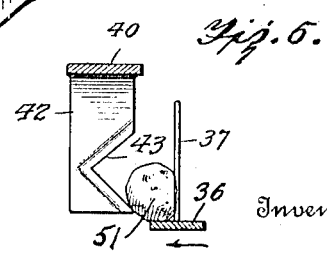
Inventor
ERNEST BROWN,

E. BROWN.
POTATO CUTTER.
APPLICATION FILED JULY 7, 1909.

947,467.

Patented Jan. 25, 1910.
2 SHEETS—SHEET 2.

Witnesses
L. H. Schmidt
R. H. Bond

Inventor
ERNEST BROWN,
By
E. H. Bond, Attorney

UNITED STATES PATENT OFFICE.

ERNEST BROWN, OF MIDDLEPORT, NEW YORK, ASSIGNOR OF ONE-HALF TO MARK D. WILLIAMS, OF MIDDLEPORT, NEW YORK.

POTATO-CUTTER.

947,467.  Specification of Letters Patent.  Patented Jan. 25, 1910.

Application filed July 7, 1909. Serial No. 506,265.

*To all whom it may concern:*

Be it known that I, ERNEST BROWN, a citizen of the United States of America, and resident of Middleport, in the county of Niagara and State of New York, have invented certain new and useful Improvements in Potato-Cutters, of which the following is a specification.

This invention relates to certain new and useful improvements in potato cutters, and it has for its objects among others to provide a simple and efficient machine by which the potatoes are cut, the sections dropped, one at a time, and provision being made for holding the potato so that when cut one part of the seed end is upon each section.

I provide means for elevating the potatoes so they will be dropped to the cutter, and when a fertilizer distributer is employed, means also are provided for elevating the fertilizer so it may fall with the potato sections into the ground. Provision is made for throwing the machine out of gear when desired, and the gearing that operates the elevators is disposed at the top of the machine, where it is readily accessible for repairs or other purposes.

I aim further at improvements in the details of construction of the various parts and of the device as a whole, whereby the parts may be easily assembled or disassembled and whereby the best results in use are attained.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which—

Figure 2:
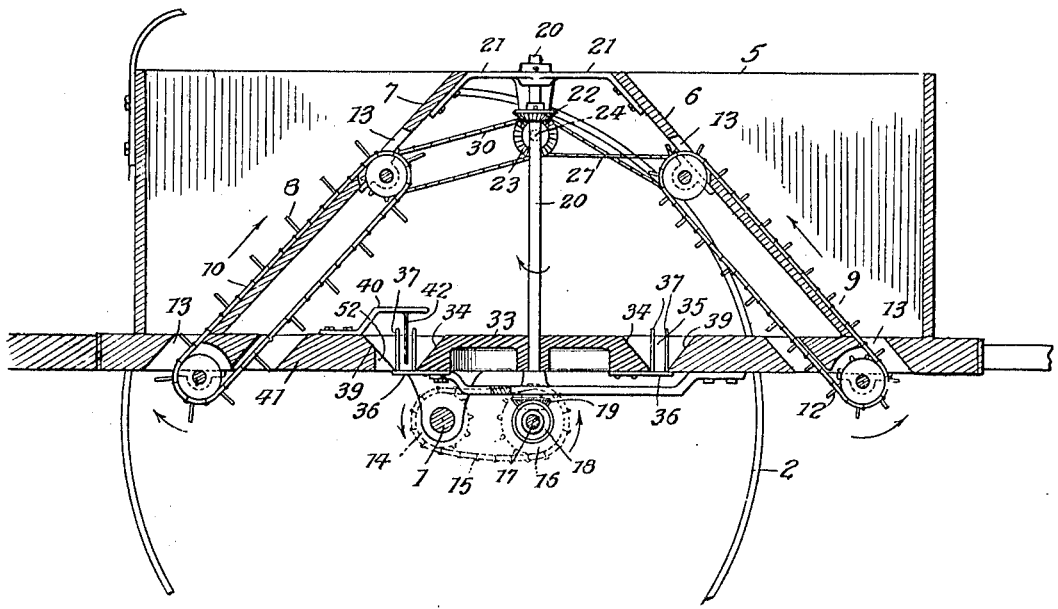
Figure 3:
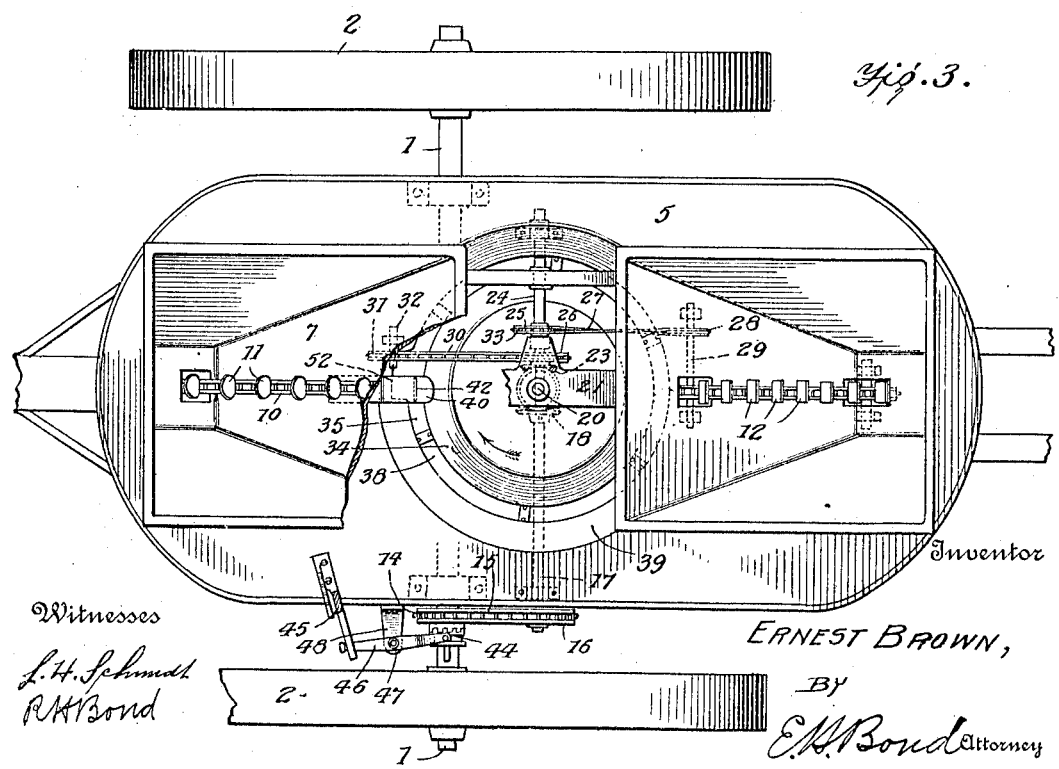

Figure 1 is a side elevation of a potato cutter embodying my present invention. Fig. 2 is a substantially central vertical longitudinal section through the same, with the plow and coverers omitted. Fig. 3 is a top plan with portions broken away and parts shown in section. Fig. 4 is a detail in bottom plan, showing the rotary disk or wheel and its carrier arms. Fig. 5 is a perspective detail, showing the knife carrier and knife and the coöperating fingers and their support. Fig. 6 is a vertical section showing the knife and the coöperating finger and its carrier, the finger being shown in engagement with a potato.

Like numerals of reference indicate like parts throughout the several views.

It is to be understood that the parts which do not constitute any part of my present invention, such as the frame, the opener, the coverers, and other parts common to potato planters, may be of any of the well known or any approved forms of construction. In the following description therefore I shall not dwell upon such parts, except briefly, it being understood that they are or may be of any of the conventional forms.

Referring to the drawings 1 designates the axle, 2 the traction wheels, 3 the furrow opener or plow, and 4 the coverers, it being understood that there are two of the latter, arranged in the usual way, although but one is shown in the drawings.

Mounted on the framework is a hopper 5 which may be arranged to hold potatoes only, or, as shown in the present instance, potatoes and fertilizer, being, as seen in Fig. 3, provided with oppositely inclined bottoms 6 and 7, forming as it were two separate hoppers. One of these, in this instance the forward one, is designed to hold the potatoes and the other the fertilizer, although it is evident that the reverse may be the case, the potatoes being at the rear and the fertilizer at the front. Furthermore, the fertilizer feature may sometimes be dispensed with, in which case but one hopper would be necessary.

When both the fertilizer and potato hoppers are employed I provide an elevator for each, as shown in the present instance. 8 is the elevator for the potatoes and 9 that for the fertilizer. Each consists of a chain or endless belt or band 10 provided with cups 11 and blades 12 respectively, as seen best in Fig. 3. In order to provide for the passage of these elevators the bottoms of the hoppers are provided with suitable openings 13 as seen in Fig. 2.

Motion may be imparted to the elevators in any suitable way. In the present instance I have shown them operated as follows;—14 is a sprocket wheel on the axle 1, and over this sprocket runs a sprocket chain 15, which in turn runs over a sprocket wheel 16 on a transverse shaft 17 mounted in suitable bearings upon the under side of the machine. On this shaft is a bevel pinion 18 which meshes with a bevel pinion 19 on a vertical shaft 20, which is mounted in suitable bearings in the frame and in the braces 21 which connect the upper ends of the two hoppers as seen in Figs. 2 and 3. On this shaft 20, at the upper end, is a bevel pinion 22, which meshes with a bevel pinion 23 on a cross shaft 24 and on this latter shaft are the sprocket wheels 25 and 26 as seen best in Fig. 3. 27 is a sprocket chain which connects the sprocket wheel 25 with a sprocket wheel 28 on the upper shaft 29 of the fertilizer elevator, and 30 is a similar sprocket chain which connects the sprocket wheel 26 with a sprocket wheel 31 on the shaft 32 of the upper sprocket of the elevator that conveys the potatoes upward. It is evident however that other means for imparting the necessary motion to the elevators may be adopted without materially affecting the operation of the mechanism now to be described.

33 is a disk or wheel carried by the shaft 20 and this disk has its outer upper edge beveled outward and downwardly as seen at 34 in Fig. 2. This disk is disposed within a circular opening 35 in the bottom of the frame between the hoppers as seen best in Fig. 2 and has radiating from its under face the arms 36 which may be of any desired number, preferably however, six, and these arms each carry two upwardly spaced apart fingers or pins 37 which work in the annular passageway or channel 38 as seen in Figs. 2 and 3. The inner wall of the opening or passage in the bottom is provided with an inwardly and downwardly inclined face as seen at 39 so as to leave a substantially V-shaped passage between such wall and that of the disk as will be understood best upon reference to Fig. 2.

40 is an arm secured to the upper face of the bottom 41, and depending from said arm, which extends over the passage 38, is a knife 42 which depends in a path substantially midway between that traversed by the fingers or pins 37 as seen clearly in Fig. 2. This knife may be of any form suited to the purpose, but as shown in Figs. 5 and 6 it is provided with a substantially V-shaped notch 43 as seen clearly in Figs. 5 and 6. This notch serves to receive the potato as it is forced thereagainst by the fingers and holds it against wabbling motion while being cut.

44 is a clutch upon the axle 1 designed to be actuated by a lever 45 and suitable connection with a pivoted arm 46 pivoted between its ends as at 47 on a lateral support 48, as seen best in Fig. 3. Actuation of this lever in one direction throws the clutch into operative position and movement of the lever in the opposite direction throws the clutch out of operative position. This clutch is of the conventional form.

The device may be provided with one or more seats, as may be preferred. I have shown two, one 49, disposed at the rear of the machine and the other 50 at the forward end.

It is to be understood that any other form of feed for the fertilizer may be employed, either a chain or force feed from the bottom, or any of the well known forms for this purpose. As seen in Figs. 2 and 3 the chains which run the elevators from the top of the shaft 20 should be crossed in order to give the proper direction of movement to the two elevators.

The operation will be readily understood from the foregoing description when taken in connection with the annexed drawings, and, briefly stated, is as follows:—When the machine is in motion the proper movement is given to all of the parts through the means hereinbefore described. As the potatoes are carried up by the elevator they fall upon the disk 33 and drop into the space between the same and the inclined wall 39 of the bottom 41, which space however is too small for the passage of the potato out of the machine. As the disk revolves the potato is engaged by the fingers 37 which carry the potato 51 along till it is engaged by the knife. As the disk continues in its movement the potato is forced against the knife which cuts it into two parts and as the potato is presented to the knife in the direction of the longitudinal dimention of the potato, when cut each part will have a portion of the seed end thereon. As the potato is cut the outside piece, that is, the piece nearest the outside of the passageway 38 will fall through an opening 52 formed laterally from the passage 38, onto the ground or into the hole or furrow opened by the opener. The other part of the potato is held by the knife till it is carried past the knife when it falls through the said opening and thus the two parts of the potato are not dropped in the same place. As the disk continues to revolve the next set of fingers take up another potato and the operation is repeated.

From the above it will be seen that I have devised a simple yet durable and efficient device for cutting and planting potatoes, and while the structural embodiment of the invention as hereinbefore disclosed is what I at the present time consider the preferable one, it is evident that the same is subject to changes, variations and modifications in the details of construction, proportion of parts etc., and I therefore do not intend to restrict myself to the details of construction hereinbefore set forth, but reserve the right to make such changes, variations and modifications as come properly within the scope of the protection prayed and as stated in the appended claims.

What is claimed as new is:—

1. In a potato cutter, a revoluble disk having an inclined edge, spaced fingers carried thereby, a stationary vertically disposed knife against which the potato is forced by said fingers, said knife and fingers being oppositely disposed adjacent the inclined edge of said disk.

2. In a potato cutter, means for feeding potatoes, a revoluble disk upon which they are dropped, said disk having a downwardly and outwardly inclined outer edge, means on said disk disposed outside of said edge for moving the potatoes, and vertically disposed means in the path of said moving means whereby the potatoes are cut beyond said inclined outer wall.

3. In a potato cutter, means for feeding potatoes, vertically disposed depending fixed means for cutting them, means for moving the potatoes against said cutting means, and means of which said cutting means forms an element for retaining one portion of the cut potato a greater length of time than the other.

4. In a potato cutter, a revoluble disk, vertically extending means disposed beyond the outer edge of said disk for moving the potatoes, vertically disposed depending cutting means, and provisions embodying said cutting means for preventing the falling of the cut sections simultaneously.

5. In a potato cutter, means for feeding potatoes, revoluble means upon which they are designed to be dropped, potato-engaging means rising from said revoluble means and disposed beyond the outer edge of said revoluble means, and a depending knife fixed in the path of said potato-engaging means.

6. In a potato cutter, a revoluble disk having its outer edge beveled to form one wall of a substantially V-shaped passageway, means forming the opposite wall, means carried by said disk movable in said passageway and a depending knife in the path of said means.

7. In a potato cutter, a revoluble disk having its outer edge downwardly and outwardly beveled, a plate having an opening in which said disk is revoluble, with the inner wall of said opening beveled inwardly and downwardly, means rising from said disk movable between said beveled walls, and a knife relatively fixed and against which the potatoes are forced by said rising means.

8. In a potato cutter, a revoluble disk having its outer edge downwardly and outwardly beveled, a plate having an opening in which said disk is revoluble and having its inner wall beveled inwardly and downwardly, means rising from said disk movable between said beveled walls, and a knife relatively fixed and against which the potatoes are forced by said rising means, there being an enlarged opening adjacent the knife through which the cut sections of the potato are dropped one after the other.

9. In a potato cutter, a revoluble disk having its outer edge beveled to form one wall of a substantially V - shaped passageway, means forming the opposite wall of said passageway, means carried by said disk movable in said passageway, and a vertically disposed knife in the path of said means and having a V-shaped notch in its cutting edge.

10. In a potato cutter, a revoluble disk having its edge downwardly and outwardly beveled, a plate having an opening in which said disk is revoluble, the inner wall of said opening being beveled inwardly and downwardly, spaced means rising from said disk movable between said beveled walls, and a relatively fixed knife having a notch in its cutting edge and against which the potatoes are forced by said rising means.

11. In a potato cutter, a revoluble disk, means for revolving the same, means coöperating with said disk to form a substantially V-shaped passage therebetween with an annular opening at the bottom of said passage, and means carried by the disk and rising therefrom and movable through said opening and in said passage and a fixed depending cutter disposed in said passage.

12. In a potato cutter, means for feeding potatoes, a revoluble disk upon which they are designed to fall, fixed vertically disposed depending means coöperating with said disk for cutting the potatoes and moving them in a circular path, and provisions of which said cutting means forms an element whereby one portion of the cut potato is held by the knife and dropped after the other portion has dropped.

Signed by me at Middleport, N. Y., this 6th day of July, 1909.

ERNEST BROWN.

Witnesses:
MARK D. WILLIAMS,
WM. CRUSS.